Patented Feb. 15, 1938

2,108,044

UNITED STATES PATENT OFFICE

2,108,044

PLASTIC MATERIALS AND TO METHODS OF PRODUCTION THEREOF

John William Croom Crawford and James McGrath, Ardrossan, Scotland, assignors to Imperial Chemical Industries Limited, a corporation of Great Britain No Drawing. Application March 23, 1935, Serial No. 12,728. In Great Britain October 25, 1933

15 Claims. (Cl. 260—2)

This invention relates to the production of plastic materials by the polymerization of the esters of methacrylic acid and more particularly to the polymerization of methyl methacrylate in granular form. The application is a continuation in part of my copending application 749,500 filed October 22, 1934.

It has already been proposed to polymerize derivatives of acrylic acid, or their homologues, or vinyl esters, by emulsifying such derivatives in liquids in which they are substantially insoluble and subsequently polymerizing them. In such previous proposals, however, the unsaturated ester compounds were generally first emulsified and then subjected to polymerizing conditions. Proceeding by these methods involves a number of steps: (1) the addition to the monomer containing a polymerization catalyst of the emulsifying agent and a non-solvent for the monomer, (2) emulsifying the resulting mixture, (3) polymerizing the emulsion, (4) adding coagulating agent, (5) coagulating the emulsified polymer, (6) removing the coagulating agent. The ultimate product obtained by such a procedure, furthermore, is not generally in a form which is easily dissolved, molded, or otherwise fabricated into an article of commerce.

We have now discovered that unsaturated esters, such as alkyl esters of methacrylic acid or its homologues or mixtures of the same can be caused to yield polymerization products in granular or globular form, providing the polymerization is effected in the presence of a suitable liquid medium and with proper agitation whereby agglomeration of the individual droplets, on the one hand, and their extended dispersion, on the other, are prevented.

Moreover, many of the disadvantages inherent in the emulsion polymerization process are eliminated by our process. It involves no emulsification prior to polymerization; no addition of coagulating agent for the product of our invention is free settling; no coagulation step, and hence no coagulating agent to remove; and most important the free settling product of our invention is in such form that it may be readily washed, dissolved, molded or otherwise treated for use in the various arts for which it is adapted. Furthermore, as would be expected, because of its high state of subdivision, the polymer obtained by the emulsion process has a low bulk density which is not readily adapted to commercial molding and considerable difficulty is encountered in attempting to "pellet" or otherwise compress this product. In contradistinction the granular product of this application has a high bulk density and is molded with facility.

Generally speaking, the production of the polymerization product in granular or globular form is effected by adding the monomeric unsaturated compound to a non-solvent liquid therefor containing a colloid, the resulting mixture is stirred, its temperature raised, and the stirring, amount of colloid, and temperature maintained at the proper degree until polymerization is complete. When the stirring is stopped the polymerized resin settles freely and substantially instantaneously, the supernatant liquid is decanted, and the product is washed and dried. The finished product consists of fine spherical granules, varying in size from $\frac{1}{8}$ to 5 mm. in diameter according to the conditions of polymerization, in contradistinction to the slimy product resulting from the coagulation of the emulsion polymer. To obtain such a unique and surprisingly useful polymerization product by the process that will hereinafter be more fully particularized is, in view of the prior art, most unexpected.

When polymerizing in accord with the general method hereinabove disclosed, it will be found that the form of the polymerized resin will vary in accord with degree of stirring, and concentration of colloid. The feature of the present invention is to so regulate these factors that a product in granular or globular form is obtained which is readily removed from the polymerizing solution and may be easily filtered and washed. It will be appreciated that, if the rate of stirring of a given system containing a monomer, a non-solvent therefor, and a colloid is sufficiently great, an emulsion will result, and it has been found that upon polymerization thereof there is obtained a permanent suspension of minutely small particles. Such a product is then coagulated to a slime which is most difficult to wash to remove coagulating agent. Alternatively, should the stirring of a given system be carried out at a very moderate rate, very litle, if any, emulsification or dispersion of the monomer will be effected and in many instances the manomer upon polymerizing will form a hard horny solid layer which sticks tenaciously to the vessel and stirrer and can be removed therefrom only with great difficulty.

In lieu of varying the rate of stirring the amount of colloid may, of course, be varied. Assuming now for the moment that an optimum stirring rate be employed, it is conceivable, and has been found by experiment to be actually a fact, that if a large amount of the colloid be employed, say, for example, 4% of glycol cellulose, a product similar to that obtained by very vigorous stirring will result, i. e. an emulsion polymer; while, on the other hand, should concentrations of this colloid be maintained at in the neighborhood of, say 0.01%, a product comparable to that of mild stirring will be obtained.

We have found, however, that by following the directions hereinafter to be specified, it is possible to so control the above factors that the polymerized product will be in a granular or globular form, which is very easily filtered and washed from the dispersing medium. As has been indicated, the stirring should not be too violent nor the amount of colloid so great that after completing the polymerization a permanent emulsion of the polymer results.

Accordingly, in order to obtain the product of this invention we have found that stirring should be used in amount substantially equivalent to that obtained in an ovaled bottom enameled vessel containing no baffles having a capacity of 50 gallons and provided with a stirrer of a flat inverted T type (10" x 1¾"), occupying 0.4 diameter of the pot and immersed 10 inches in the solution, the vessel having been charged with 25 gallons of water containing 0.3% of glycol cellulose and 5 gallons of monomeric methyl methacrylate, the stirrer being revolved at 510 R. P. M. and the solution maintained at a temperature of 82° C. It will be found that after a period of approximately one hour, under these conditions, the monomer will be substantially entirely converted to a polymer which is in granular form and which settles freely and quickly upon stopping the stirrer. If in this example the concentration of glycol cellulose be increased to 4%, an emulsion is obtained that gives a slimy product upon coagulation. On the other hand, should the amount of glycol cellulose be lowered to approximately 0.01% the polymerization will proceed with simultaneous fusion of the particles of polymer to each other, giving a solid, horny mass, which will adhere firmly to the vessel and often stop the stirring mechanism entirely, and necessitate destruction of the vessel in many instances before the resin can be removed therefrom.

An object of this invention, therefore, is to, on the one hand, conduct the polymerization of the herein named bodies under such conditions and concentrations that the emulsified product or alternatively the solid, horny mass is not obtained. Between these extremes, then, lies applicants' process and they have found that by proper coordination of stirring and character and concentration colloid, it is possible to keep between the two undesirable limits and obtain the preferred product.

According to the present invention, plastic materials may be obtained in granular or globular form by polymerizing, in the manner hereinbefore indicated, alkyl esters of methacrylic acid or mixtures of the same, and more particularly methyl, ethyl, propyl, butyl, isobutyl, and the higher methacrylates and including likewise the various saturated and unsaturated esters of methacrylic acid disclosed in the copending applications of Barrett and Strain Ser. Nos. 735,274-5-6-7-8-9 and the application of Woodhouse Ser. No. 735,280, Graves Ser. No. 735,281, and Izard Ser. No. 735,282 filed on July 14, 1934. Mixtures and interpolymers of these various unsaturated compounds with each other or with other polymerizable compounds such as the halogenated vinyl esters, etc. may likewise be polymerized by the process of the present invention.

As has been indicated, the proportions of the colloids will vary in large measure in accord with their ability to act as a dispersing agent, but generally speaking lyophilic colloids are preferred. By the term lyophilic colloid as employed herein, we mean to include a high molecular weight material which has an affinity for the dispersing medium. Compounds such as soluble starch, gum tragacanth, gum acacia, gum tragon, water soluble glycol cellulose, sodium alginate, agar agar, glue and gelatin may be used. Glycol celluloses which are soluble in sodium hydroxide, altho insoluble in water, may be used in very dilute alkaline solutions. Ordinarily, these colloids and colloids having like dispersing powers may be used in concentrations varying from .2 to 3%, altho in some instances more may be required, the percentage being based upon the weight of the unsaturated compound being polymerized. Those skilled in the art will appreciate the fact that the enumerated colloids all do not have equal dispersing powers, e. g. gum tragacanth is less effective than glycol cellulose and various types of starches vary in accord with the past history of the starch. Accordingly, when changing from one colloid to another a greater or lesser amount thereof must be employed providing the effectiveness of the substituting colloid is less or greater than that of the colloid first employed. The determining factor is, of course, that the percentage of colloid be so adjusted that our preferred granular form of polymer is produced.

The volume of the aqueous or other medium in which the polymerization is to be effected may conveniently amount to about one to ten times the volume of the unsaturated compound, and the reaction mixture may be prepared by adding the aqueous or other type of solution to the unsaturated compound or vice versa. The former method is preferred.

By what has been said it will be appreciated that agitation is essential from the inception of the actual polymerization until the product is substantially completely polymerized, since the medium in which the unsaturated compound is treated is of such a type that separation in two liquid phases takes place if the agitation is interrupted before or shortly after the inception of polymerization.

The process of this invention results in the production of the polymerized material in the form of solid granules or globules which are chemically and physically homogeneous, altho the particles may or may not be of such small diameter that the material has a powder-like appearance in bulk. This product, as has hereinbefore been emphasized, is particularly easy to remove from the polymerization vessel and may be applied directly for any purpose for which the polymer is commonly employed without the necessity of previous grinding, cutting, or other comminuting treatment.

The polymerization may be effected, for instance, by heating the mixture in contact with a polymerization catalyst, or by subjecting it to ultraviolet light, agitation being continued until the polymer is no longer sticky. The polymer is then isolated from the reaction mixture, by filtration, and washed with an appropriate agent to remove as far as possible any adhering colloid. It may then be washed with water and dried. If desired, a proportion of plasticizer substantially insoluble in water may be mixed with the unsaturated compound before commencing the polymerization or should a non-solvent other than water be employed, plasticizers insoluble in such liquid medium may likewise be used. By such a procedure a plasticized granular polymer will thus be produced. Similarly, dyed, tinted, or filled polymer may be obtained.

As the heat evolved in the polymerization of these compounds is frequently large, a part only of the charge of the monomeric compound may be mixed with the aqueous or other medium at the commencement of polymerization, the remainder of the monomer being added gradually thereafter so as to maintain the evolution at a given rate.

The invention is illustrated by the following examples in which all parts are by weight:

*Example 1.*—562 parts of a 5% aqueous solution of a water soluble glycol cellulose were freed from any suspended insoluble matter by centrifuging and diluted with 5,000 parts of water. This solution was added to 2,270 parts of methyl methacrylate containing 22.7 parts of benzoyl peroxide in solution and the mixture was placed in an enameled cast iron jacketed vessel, fitted with a reflux condenser, a thermometer, and a mechanical stirrer with a water seal and external bearings to prevent oil contamination of the product. After stirring had been commenced steam was admitted to the jacket, and the temperature of the reaction mixture raised to the neighborhood of 80° C. The speed of reaction was controlled by admitting water at a suitable temperature to the jacket so that a convenient rate of refluxing of water-ester mixture was maintained. When the bulk of the reaction had taken place, steam was re-admitted to the jacket and the temperature of the reaction mixture raised to the neighborhood of 100° C. to ensure complete polymerization of the methyl methacrylate.

The solid product was separated by filtration and washed firstly with 0.1% caustic soda solution to remove adsorbed glycol cellulose, and subsequently with several successive quantities of water. The product was then centrifuged and dried at a temperature of 40° C., being obtained finally in the form of a white sand-like powder.

A stirrer speed of about 250 revolutions per minute is suitable when treating a charge of 15 lbs. of the ester as described in the above example.

*Example 2.*—5 parts of benzoyl peroxide and 50 parts of dibutyl phthalate were dissolved in 500 pars of methyl methacrylate, and the solution was agitated with a solution of 24 parts of gum acacia in 1200 parts of water. The mixture was heated and polymerization carried out as described in Example 1. The solid product was separated by filtration, washed by several successive quantities of water and dried. If desired, an additional washing with 0.1 per cent of hydrochloric acid may be given directly after the filtration.

The product, a fine powder, is suitable for use in the production of molded articles.

*Example 3.*—A solution of 8.45 parts of benzoyl peroxide in 845 parts of ethyl methacrylate was mixed with a solution of 211 parts of 8% aqueous glycol cellulose in 1,500 parts of water. Polymerization was effected as in Example 1, and the product which was similarly isolated formed a white sand-like granular mass.

*Example 4.*—7.7 parts of a ruby-colored dye, known under the term Spirit Red III (Color Index No. 258), and 40.9 parts of benzoyl peroxide were dissolved in a mixture of 4,086 parts of methyl methacrylate and 408.6 parts of dibutyl phthalate. The solution was agitated and heated with a solution of 374 parts of 8% aqueous glycol cellulose in 10,500 parts water. The polymer was purified as in Example 1, and formed a red granular powder suitable for use in the production of injection molded articles.

*Example 5.*—100 parts by weight of methyl methacrylate containing in solution 1 part of benzoyl peroxide were mixed with 200 parts of water containing in solution 2 parts of a suitable soluble starch. The mixture was stirred at 1000 R. P. M. and steam was blown into the stirred mixture to raise the temperature to 75° C. and maintain it at that value. After 115 minutes the temperature began to rise and the steam was shut off. When the maximum temperature of 82° C. was reached this mixture was cooled to 60° C. by the addition of cold water. The solid granular product was separated by centrifuging and washed with 1% HCl, water, 2% ammonia solution and repeatedly with water. The washed granules were dried at a temperature of 100° C.

*Example 6.*—100 parts by weight of methyl methacrylate containing in solution 1 part of benzoyl peroxide were mixed with 200 parts of water containing in solution 2 parts of gelatine. The mixture was treated in the same manner as in Example 5 and a granular polymerization product was obtained.

*Example 7.*—0.2 part of benzoyl peroxide were dissolved in 20 parts of methyl methacrylate and 5 parts of the solution added to 35 parts of an 0.26% aqueous glycol cellulose solution. The mixture was placed in an enameled cast iron vessel fitted with a reflux condenser and an agitator, and heated to 80° C. with mechanical agitation, until the commencement of vigorous polymerization was noticed. The rest of the benzoyl peroxide-ester solution was added to the reaction mixture at such a rate as to allow of convenient control of the heat evolved in the reaction. The granular product was washed with dilute (1%) caustic soda, and then with water, finally being dried in an oven at about 45° C. in a current of air.

*Example 8.*—5 parts of benzoyl peroxide were dissolved in 500 parts of vinyl acetate, and the solution stirred with 1,000 parts of 0.5% glycol cellulose solution, with warming. Polymerization occurred with vigorous evolution of heat. Monomeric vinyl acetate and water which boiled off from the reaction mixture were condensed and returned to the system. On completion of polymerization, the mixture was cooled down, and the granular polymerized vinyl acetate drained from the aqueous portion, washed with cold dilute caustic soda, then with cold water, and spread out in thin layers on trays to dry at atmospheric temperature.

From a consideration of the above specification it will be appreciated that many changes may be made in the invention as covered in the appended claims without departing from its scope.

We claim:

1. A process for the preparation of methacrylic acid ester polymers in granular form which comprises dispersing and polymerizing while thus dispersed a monomeric methacrylic acid ester in a non-solvent therefor by means of a dispersing agent and stirring, the concentration of the dispersing agent being not substantially greater than an amount sufficient to maintain the ester in the dispersed phase while stirring is continued, and, to prevent coalescence of the dispersed particles during polymerization, the quantity of dispersing agent also being insufficient to give a permanently dispersed product.

2. A process for the preparation of methacrylic acid esters in granular form which comprises dispersing and polymerizing while thus dispersed a monomeric methacrylic acid ester in water by means of a dispersing agent and stirring, the concentration of the dispersing agent being not substantially greater than an amount sufficient to maintain the esters in the dispersed phase while stirring is continued, and, to prevent coalescence of the dispersed particles during polymerization, the quantity of dispersing agent also being insufficient to give a permanently dispersed product.

3. A process for the preparation of methyl methacrylate polymer in granular form which comprises dispersing and polymerizing while thus dispersed monomeric methyl methacrylate in a non-solvent therefor by means of a dispersing agent and stirring, the concentration of the dispersing agent being not substantially greater than an amount sufficient to maintain the esters in the dispersed phase while stirring is continued, and, to prevent coalescence of the dispersed particles during polymerization, the quantity of dispersing agent also being insufficient to give a permanently dispersed product.

4. A process for the preparation of methyl methacrylate polymer in granular form which comprises dispersing and polymerizing while thus dispersed monomeric methyl methacrylate in water by means of glycol cellulose, the concentration of glycol cellulose being not substantially greater than that necessary to maintain the monomeric ester in the dispersed phase while stirring is continued, and, to prevent coalescence of the dispersed particles of the methyl methacrylate during its polymerization, the quantity of dispersing agent also being insufficient to give a permanently dispersed product.

5. A process for the preparation of methacrylic acid ester polymers in granular form which comprises dispersing and polymerizing while thus dispersed a monomeric methacrylic acid ester in a non-solvent therefor, by means of a colloid selected from the group consisting of a soluble starch, gum tragacanth, gum acacia, gum tragon, water soluble glycol cellulose, sodium alginate, agar agar, glue and gelatin and stirring, the concentration of the colloid being not substantially greater than an amount sufficient to maintain the ester in the dispersed phase while stirring is continued, and, to prevent coalescence of the dispersed particles during polymerization, the quantity of dispersing agent also being insufficient to give a permanently dispersed product.

6. In a process for the preparation of methacrylic acid ester polymers in granular form the step which comprises maintaining a dispersion of the monomeric methacrylic acid ester by means of a colloid selected from the group consisting of a soluble starch, gum tragacanth, gum acacia, gum tragon, water soluble glycol cellulose, sodium alginate, agar agar, glue and gelatin and stirring thruout polymerization, the concentration of colloid and the rate of stirring being such that upon cessation of stirring before polymerization has been effected substantially all of the monomeric methacrylic acid ester will quickly coalesce to the liquid phase and upon cessation of stirring after polymerization the methacrylic acid ester polymer will freely settle as a granular product.

7. In a process for the preparation of methyl methacrylate polymer in granular form the step which comprises maintaining the methyl methacrylate monomer in the dispersed phase by means of a colloid selected from the group consisting of a soluble starch, gum tragacanth, gum acacia, gum tragon, water soluble glycol cellulose, sodium alginate, agar agar, glue and gelatin and stirring thruout the polymerization reaction, the concentration of the colloid and the rate of stirring being such that upon cessation of stirring before polymerization has been effected substantially all of the methyl methacrylate monomer will quickly coalesce to the liquid phase, and upon cessation of stirring after polymerization the methyl methacrylate polymer will freely settle as a granular product.

8. In a process for the preparation of methyl methacrylate polymers in granular form the steps which comprise polymerizing in a liquid mixture containing methyl methacrylate and a non-solvent therefor in the presence of a sufficient quantity of a colloid selected from the group consisting of a soluble starch, gum tragacanth, gum acacia, gum tragon, water soluble glycol cellulose, sodium alginate, agar agar, glue and gelatin while maintaining a proportional amount of stirring to give a product the particles of which will not coalesce to produce a solid during polymerization, the amount of colloid and the amount of stirring being insufficient to give a permanently emulsified product.

9. In a process for the preparation of methyl methacrylate polymers in granular form the steps which comprise polymerizing in an aqueous medium containing monomeric methyl methacrylate and in the presence of a sufficient quantity of colloid selected from the group consisting of a soluble starch, gum tragacanth, gum acacia, gum tragon, water soluble glycol cellulose, sodium alginate, agar agar, glue and gelatin while maintaining a proportional amount of stirring to give a product the particles of which do not coalesce to produce a solid during polymerization, the amount of colloid and the amount of stirring being insufficient to give a permanently emulsified product.

10. In a process for the preparation of methyl methacrylate polymers in granular form the step which comprises polymerizing the methyl methacrylate in a mixture containing approximately one part of methyl methacrylate to four parts of water, and approximately 0.2% to 3.0% of a colloid selected from the group consisting of a soluble starch, gum tragacanth, gum acacia, gum tragon, water soluble glycol cellulose, sodium alginate, agar agar, glue and gelatin, while maintaining a moderate amount of stirring which is sufficient to give a product the particles of which do not coalesce to produce a solid during polymerization, altho not so great that a permanently emulsified product is obtained upon complete polymerization.

11. In a process for the preparation of methacrylic acid ester polymers in granular form the step which comprises polymerizing, in a liquid mixture containing the methacrylic acid ester and a non-solvent therefor, and in the presence of a sufficient quantity of a colloid selected from the group consisting of a soluble starch, gum tragacanth, gum acacia, gum tragon, water soluble glycol cellulose, sodium alginate, agar agar, glue and gelatin while maintaining a proportional amount of stirring to give a free settling product of separate and distinct particles ranging from ⅛ to 5 mm. in diameter.

12. A process for the preparation of methacrylic acid ester polymers in granular form which comprises preparing a liquid mixture containing a monomeric methacrylic acid ester, a non-solvent therefor, and a colloid selected from the group consisting of a soluble starch, gum tragacanth, gum acacia, gum tragon, water soluble glycol cellulose, sodium alginate, agar agar, glue and gelatin, stirring the resulting mixture to give a dispersion such that upon cessation of stirring the particles tho monomer will substantially immediately coalesce, heating the dispersed mixture until polymerization is complete, and subsequently stopping the stirring and separating by decantation the free settling granular methyl methacrylate polymer from the dispersing medium.

13. A process for the preparation of methyl methacrylate polymers in granular form which comprises preparing a liquid mixture containing monomeric methyl methacrylate, a non-solvent therefor, and a colloid selected from the group consisting of a soluble starch, gum tragacanth, gum acacia, gum tragon, water soluble glycol cellulose, soduim alginate, agar agar, glue and gelatin, stirring the resulting mixture to give a dispersion such that upon cessation of stirring the particles of monomer will substantially immediately coalesce heating the dispersed mixture until polymerization is complete, and subsequently stopping the stirring and separating by decantation the free settling granular methyl methacrylate polymer from the dispersing medium.

14. A process for the preparation of metacrylic acid esters in granular form which comprises dispersing a monomeric methacrylic acid ester in water by means of a dispersing agent present in an amount not substantially greater than the amount necessary to maintain the ester in the dispersed phase while stirring is continued and to prevent coalescence of the dispersing particles during polymerization, the quantity of dispersing agent also being insufficient to give a permanently dispersed product, the polymerization being initiated by raising the temperature to approximately 75° C. and maintaining the temperature during polymerization between approximately 75° C. and 82° C. until polymerization is complete.

15. In a process for the preparation of polymeric methyl methacrylate in granular form the step which comprises polymerizing the methyl methacrylate in a mixture containing approximately one part of methyl methacrylate to four parts of water, and approximately 0.2% to 3.0% of a colloid selected from the group consisting of a soluble starch, gum tragacanth, gum acacia, gum tragon, water soluble glycol cellulose, sodium alginate, agar agar, glue and gelatin, while maintaining a moderate amount of stirring which is sufficient to give a product the particles of which do not coalesce to produce a solid during polymerization altho not so great that a permanently emulsified product is obtained upon complete polymerization, the polymerization being initiated by raising the temperature to approximately 75° C. and during polymerization being maintained at a temperature between approximately 75° C. and 82° C.

JOHN WILLIAM CROOM CRAWFORD.
JAMES McGRATH.